US012368286B2

(12) United States Patent
Jimenez Gonzalez et al.

(10) Patent No.: US 12,368,286 B2
(45) Date of Patent: Jul. 22, 2025

(54) POWER SUB-FEED DEVICE

(71) Applicant: EATON INTELLIGENT POWER LIMITED, Dublin (IE)

(72) Inventors: Sandy Omar Jimenez Gonzalez, Coraopolis, PA (US); Rajesh Kumar Reddy Appal, Oakdale, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 379 days.

(21) Appl. No.: 18/081,212

(22) Filed: Dec. 14, 2022

(65) Prior Publication Data
US 2024/0204491 A1 Jun. 20, 2024

(51) Int. Cl.
*H02B 1/20* (2006.01)
*H02B 1/01* (2006.01)
*H02J 9/06* (2006.01)

(52) U.S. Cl.
CPC .............. *H02B 1/20* (2013.01); *H02B 1/01* (2013.01); *H02J 9/06* (2013.01)

(58) Field of Classification Search
CPC . H02B 1/056; H02B 1/20; H02B 1/04; H02B 1/24; H02B 1/26; H02B 1/21; H02B 1/32; H02B 1/30; H02B 1/305; H02B 13/00; H02B 1/48; H02B 1/01; B60R 16/0238; B60R 16/0239; H05K 7/026; H05K 7/1492; H01H 85/205; H01H 71/08; H01H 85/0026; H01F 38/00; H02J 9/06
See application file for complete search history.

(56) References Cited

U.S. PATENT DOCUMENTS

| | | | | | |
|---|---|---|---|---|---|
| 2,882,513 | A | * | 4/1959 | Olashaw | H01R 9/22 439/682 |
| 4,783,718 | A | * | 11/1988 | Raabe | H02B 1/20 361/652 |
| 5,351,165 | A | * | 9/1994 | Hancock | H02B 1/20 174/68.2 |
| 5,640,295 | A | * | 6/1997 | Harris | H02B 1/04 361/825 |
| 6,229,692 | B1 | * | 5/2001 | Stendardo | H02B 1/056 174/68.2 |
| 7,405,923 | B2 | * | 7/2008 | Kelly | H02B 1/14 361/627 |
| 7,599,171 | B1 | * | 10/2009 | Remmert | H02J 9/062 307/64 |

(Continued)

*Primary Examiner* — Michael A Matey
(74) *Attorney, Agent, or Firm* — Eckert Seamans Cherin & Mellott, LLC

(57) ABSTRACT

A power sub-feed device includes a plurality of bus bars comprising a line bus bar and a load bus bar; a plurality of terminals including a line terminal, a power deviation terminal, a power reception terminal, and a load terminal; a collar assembly attached to the plurality of bus bars; a frame that receives the collar assembly and the plurality of bus bars and covers at least the collar assembly and the plurality of bus bars, where the power sub-feed device is structured to deviate primary power to a secondary device via the power deviation terminal, the secondary device including an automatic transfer switch coupled to a secondary power source, receive power from the secondary device via the power reception terminal, and supply the power from a selected power supply source a load coupled to the main power panel via the load terminal.

20 Claims, 14 Drawing Sheets

(56) References Cited

U.S. PATENT DOCUMENTS

| | | | |
|---|---|---|---|
| 2005/0047044 A1* | 3/2005 | Nolden | H02M 7/003 |
| | | | 361/103 |
| 2006/0044739 A1* | 3/2006 | Oesterhaus | H01R 31/085 |
| | | | 361/611 |
| 2006/0052905 A1* | 3/2006 | Pfingsten | H05K 7/1471 |
| | | | 323/295 |
| 2006/0072284 A1* | 4/2006 | Arguello | H01R 9/2458 |
| | | | 361/601 |
| 2009/0046415 A1* | 2/2009 | Rasmussen | H02J 9/06 |
| | | | 361/644 |
| 2010/0328850 A1* | 12/2010 | Remmert | H02B 1/056 |
| | | | 361/634 |
| 2011/0075326 A1* | 3/2011 | Barnas | H02B 1/056 |
| | | | 361/624 |
| 2011/0176258 A1* | 7/2011 | Creighton | H02B 1/056 |
| | | | 361/642 |
| 2014/0063695 A1* | 3/2014 | Martin | H02B 1/42 |
| | | | 361/647 |
| 2017/0054276 A1* | 2/2017 | Zhang | H02B 1/20 |
| 2017/0330701 A1* | 11/2017 | Betances Sansur | H01H 71/02 |
| 2017/0358416 A1* | 12/2017 | Kamor | H02B 1/26 |
| 2018/0316192 A1* | 11/2018 | Petrosyan | H02S 40/30 |
| 2018/0331513 A1* | 11/2018 | Rehmer | H01R 25/142 |
| 2020/0241585 A1* | 7/2020 | Petrosyan | H02J 7/35 |
| 2022/0123582 A1* | 4/2022 | Phillips | H02J 3/381 |
| 2023/0066713 A1* | 3/2023 | Hande | H01R 4/56 |
| 2023/0283051 A1* | 9/2023 | Bhattar | H02B 1/04 |
| | | | 361/627 |

* cited by examiner

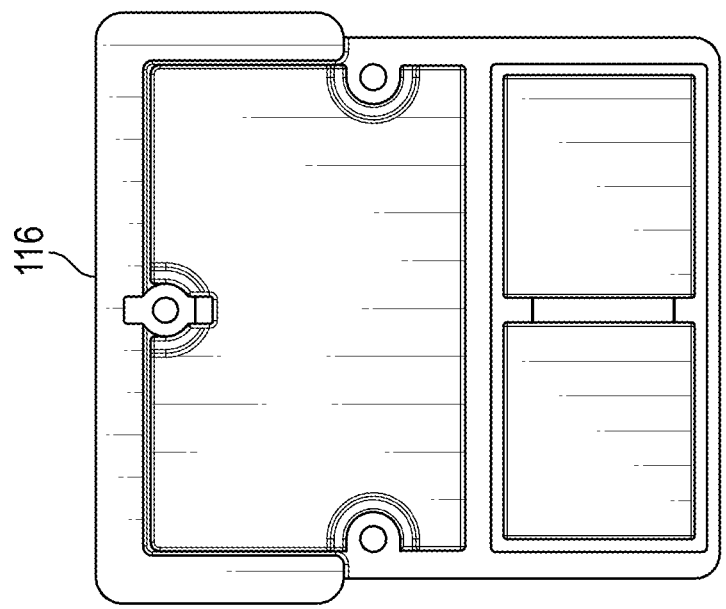
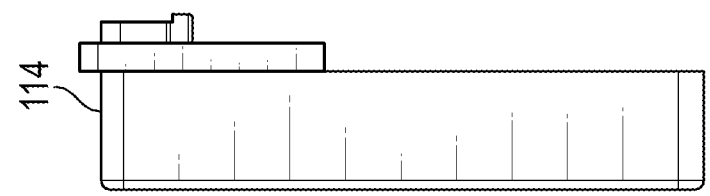
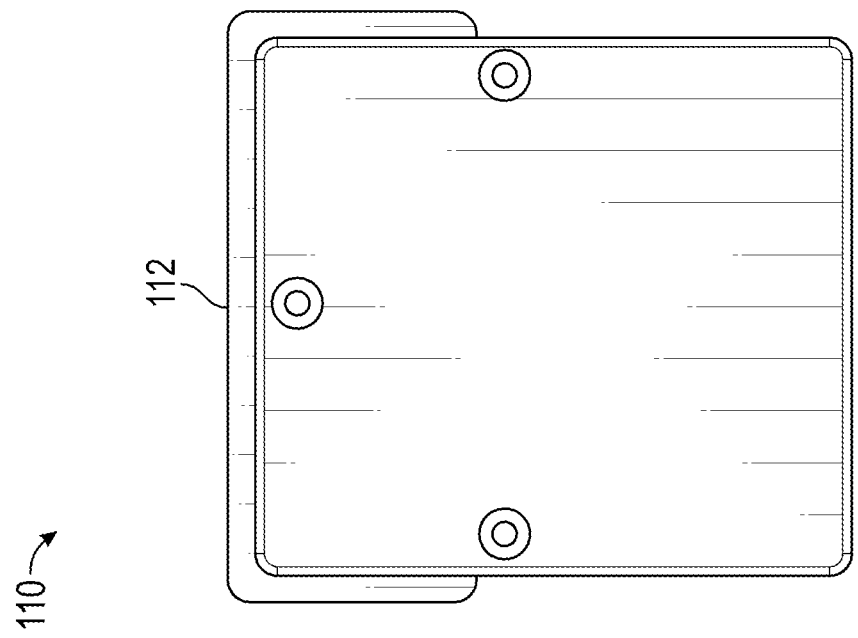

POWER SUB-FEED DEVICE

FIELD OF THE INVENTION

The disclosed concept relates generally to an apparatus and method of power distribution in an electrical network, and in particular a power sub-feed system including a power sub-feed device and a secondary device and structured to connect a secondary power source to an existing main power panel, deviate power from a primary power source to the secondary device, selects one of the primary power source or the secondary power source, and supply power from a selected power source to the loads.

BACKGROUND OF THE INVENTION

As a demand for renewable power sources for residential and commercial facilities increases, so has a demand for an improve power distribution system that add an access capability to alternative power sources to an existing main power panel in residential or commercial facilities, which typically does not have the access to the alternative power source. However, retrofitting the existing main power panels so as to be able to access the alternative power sources as a power supply can require significant resources and costs. For example, the conventional main power panels may lack spaces or wiring capabilities for installing metering, islanding or communications terminals needed for operation of a switch (e.g., a manual switch or an automatic transfer switch (ATS)) that allows a user to switch from a primary power source (e.g., utility grid) to the alternative power sources or vice versa. Further, in cases where the switch is installed near or within the conventional main power panel, the secondary power source may supply power only to specific loads coupled to the secondary power source via the switch as an emergency backup power. In some cases, the switch may be connected upstream to a main breaker of the main power panel, thereby depriving the loads that are coupled to branch breakers via the switch from the protection of the main breaker during fault events (e.g., a large overload event). In addition, when there is power outage, since only the loads coupled to the alternative sources via the switch will receive power, the other loads coupled to the primary power source may abruptly turn off, possibly sustaining damages or incurring operational losses.

There is a room for improvement of a power distribution system.

There is a need for a simplified mechanism to add alternative power sources to conventional power distribution systems without having to expend significant resources and costs.

SUMMARY OF THE INVENTION

These needs, and others, are met by embodiments of the disclosed concept in which a power sub-feed device is provided. The power sub-feed device includes: a plurality of bus bars comprising a line bus bar and a load bus bar; a plurality of terminals including a line terminal, a power deviation terminal, a power reception terminal, and a load terminal; a collar assembly attached to the plurality of bus bars; a frame that receives the collar assembly and the plurality of bus bars and covers at least the collar assembly and the plurality of bus bars, where the power sub-feed device is structured to deviate primary power received from a primary power source in the main power panel to a secondary device via the power deviation terminal, the secondary device coupled to the main power panel and including at least a switch that is coupled to a secondary power source and structured to switch between the primary power source or the secondary power source based at least in part on a user selection of the primary power source or the secondary power source as a power supply source, receive power from the secondary device via the power reception terminal, and supply the power from the selected power supply source to a plurality of loads coupled to the main power panel via the load terminal.

Another embodiment provides a power sub-feed system including a power sub-feed device and a secondary device. The power sub-feed device includes a plurality of bus bars comprising a line bus bar and a load bus bar; a plurality of terminals including a line terminal, a power deviation terminal, a power reception terminal, and a load terminal; a collar assembly attached to the plurality of bus bars; a frame that receives the collar assembly and the plurality of bus bars and covers at least the collar assembly and the plurality of bus bars. The secondary device is coupled to the power sub-feed device and includes a switch coupled to a secondary power source and structured to switch between the primary power source or the secondary power source based at least in part on a user selection of the primary power source or the secondary power source as a primary power source. The power sub-feed device is structured to deviate primary power received from a primary power source in the main power panel to a secondary device via the power deviation terminal, receive power from the secondary device via the power reception terminal, and supply the power from the selected power supply source to a plurality of loads coupled to the main power panel via the load terminal.

Yet another embodiment provides a method of distributing power using a power sub-feed device disposed in a main power panel coupled to a primary power source and a plurality of loads. The method includes: receiving, by the power sub-feed device, primary power from the primary power source via a line terminal of the power sub-feed device; deviating, by the power sub-feed device, the primary power from the main power panel to a secondary device via a power deviation terminal of the power sub-feed device, the secondary device coupled to the main power panel, the secondary device including at least an automatic transfer switch (ATS) coupled to a secondary power source; selecting one of the primary power source or the secondary power source as a power supply source based on a user input; receiving power from the selected power source via a power reception terminal of the power sub-feed device; and supplying the power to the plurality of loads via a load terminal of the power sub-feed device.

BRIEF DESCRIPTION OF THE DRAWINGS

A full understanding of the invention can be gained from the following description of the preferred embodiments when read in conjunction with the accompanying drawings in which:

FIGS. 8A-C illustrate a top cover of a power sub-feed device in accordance with an example embodiment of the disclosed concept;

DETAILED DESCRIPTION OF THE INVENTION

Figure 1:
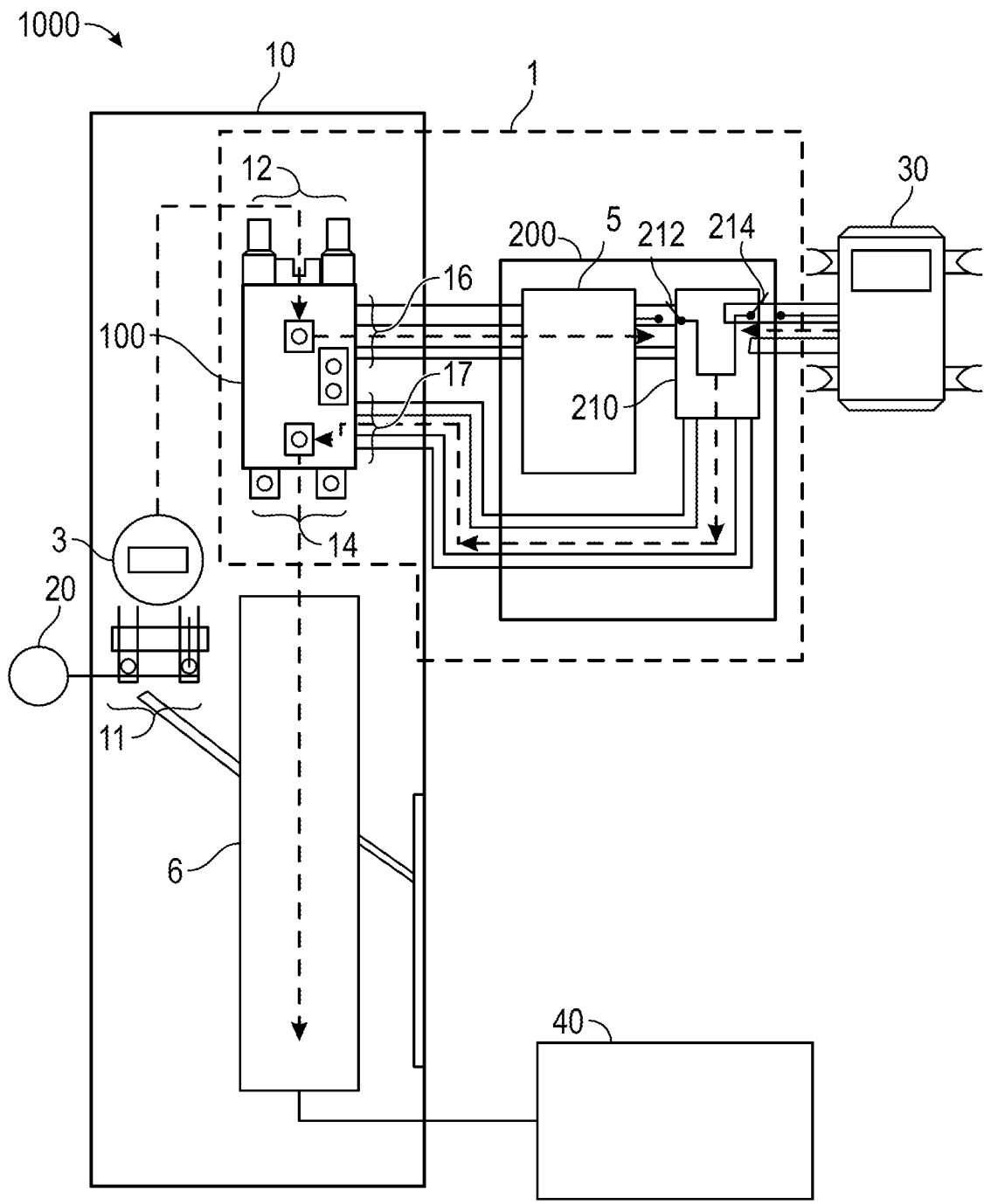
FIG. 1 is a diagram of a power system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Some example embodiments of the disclosed concept, which will be described in more detail herein, provide an apparatus, a system and method for adding a secondary power source in a power distribution system including a conventional main power panel that generally does not have an access capability to the secondary power source. The power distribution system can be retrofitted to include a power sub-feed device structured to be disposed in a main power panel and coupled to a secondary device (e.g., without limitation, a secondary power panel) including at least a switch that selectively switches between the primary power source and the secondary power source based on a user selection. The switch may be, for example and without limitation, a manual switch(es) or an automatic transfer switch (ATS). The main power panel is coupled to a primary power source and the secondary device is coupled to at least the power sub-feed device and a secondary power source. In some embodiments, the power sub-feed device may replace the main breaker in the main power panel and the main breaker is placed in the secondary device and coupled to the power sub-feed device and the switch. In some embodiments, the power sub-feed device may be coupled downstream to the main breaker disposed in the main power panel. In some other embodiments, the power sub-feed device may include at least two separate parts, a first part disposed downstream to the main breaker at one portion of the main power panel and structured to deviate the primary power from the main power panel to the secondary device and a second part also disposed downstream to the main breaker at another portion of the main power panel and structured to receive selected power from the switch. Upon retrofitting, the power sub-feed device deviates primary power from the main power panel to the secondary device, and, upon a user selection of a power supply source, receives power to supply the load from the selected power supply source via the switch.

Therefore, the embodiments in accordance with the disclosed concept provides a simplified retrofitting of the power distribution system, taking into account of different space availability within the main power panel. In some embodiments, the retrofitting is achieved in simple steps of (1) replacing the main breaker with the power sub-feed device in the main power panel, (2) placing the main breaker in the secondary device upstream to the switch disposed therein and coupled to the secondary power source, and (3) connecting the power sub-feed device to the secondary device. In some other embodiments, the retrofitting includes simple steps of (1) connecting the power sub-feed device downstream to the main breaker with the main power panel and (2) connecting the power sub-feed device to the switch disposed in the second panel and coupled to the secondary power source. In yet some other embodiments, the retrofitting includes connecting a first part of the power sub-feed device downstream to the main breaker at one portion of the main panel and the second part to the switch at another portion of the main power panel.

Such simplified retrofitting adds easily access capability to the secondary power source without having to expend significant resources, and costs in installing, e.g., without limitation, metering islanding, communications terminals, etc., that conventional or other currently available retrofitting of the conventional main power panel generally requires. In addition, by placing the main breaker upstream to the switch, the power sub-feed system allows the main breaker to provide protection to all of the loads coupled downstream to the main breaker, i.e., all of the loads coupled to the load center of the main power panel. As such, in an event of a fault (e.g., a large overload), the main breaker will trip and protect all of the loads coupled to the load center regardless of which power source has been selected. Further, a power sub-feed device is connected downstream to a meter in the main power panel, and thus the meter reflects accurately the primary power supplied to the loads since the switch disconnects the main breaker that receives the primary power deviated from the main power panel upon selection of the secondary power source. Additionally, a voltage surge protector may be included within the power sub-feed device, thereby protecting the power distribution system and the loads coupled thereto from sudden voltage surge without having to install the voltage surge protector within the already crowded main power panel. Moreover, the power sub-feed device may also include one or more indicator structured to indicate the condition of the voltage surge protector and/or the status of power supply (e.g., whether the primary power source or the secondary power source is supplying power to the loads, whether the power is being supplied to the loads in general, etc.).

FIG. 1 is a diagram of a power distribution system 1000 in accordance with an example embodiment of the disclosed concept. The power distribution system 1000 is a conventional power distribution system for residential or commercial facilities and has been retrofitted to include a power sub-feed system 1 that includes a power sub-feed device 100 and a secondary device (e.g., without limitation secondary power panel) 200 and provides an access capability to a secondary power source 30 (e.g., without limitation, a solar panel, an energy storage system such as a battery, etc.). The power distribution system 1000 also includes a main power panel 10, which has a power meter 3 and a load center 6. The power meter 3 is coupled to line conductors 11 that are coupled to a primary power source 20 (e.g., without limitation, utility grid). It is a standard power meter, and thus, a general description of the meter 3 is omitted for brevity. The load center 6 includes a plurality of branch circuit breakers coupled to the loads 40. The main power panel 10 also includes the power sub-feed device 100 which has replaced a main breaker 5 that was previously disposed in the main power panel 10 before the retrofitting.

Figure 4:
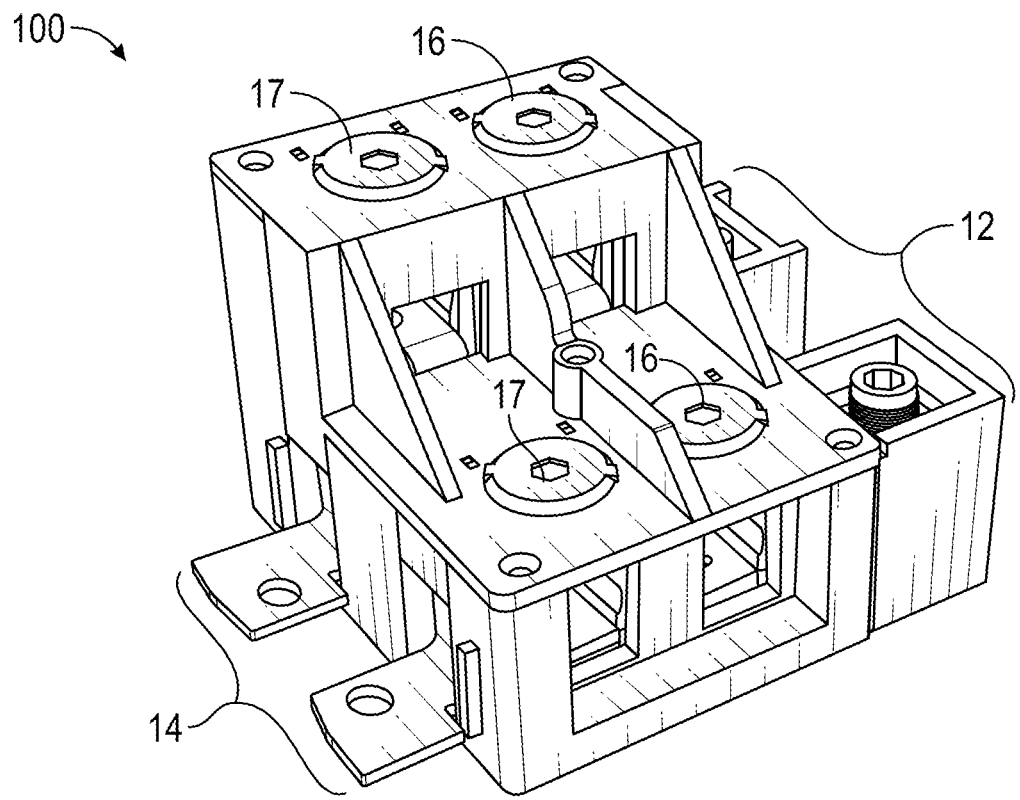
FIG. 4 is a perspective view of a power sub-feed device in accordance with an example embodiment of the disclosed concept.
Figure 5:
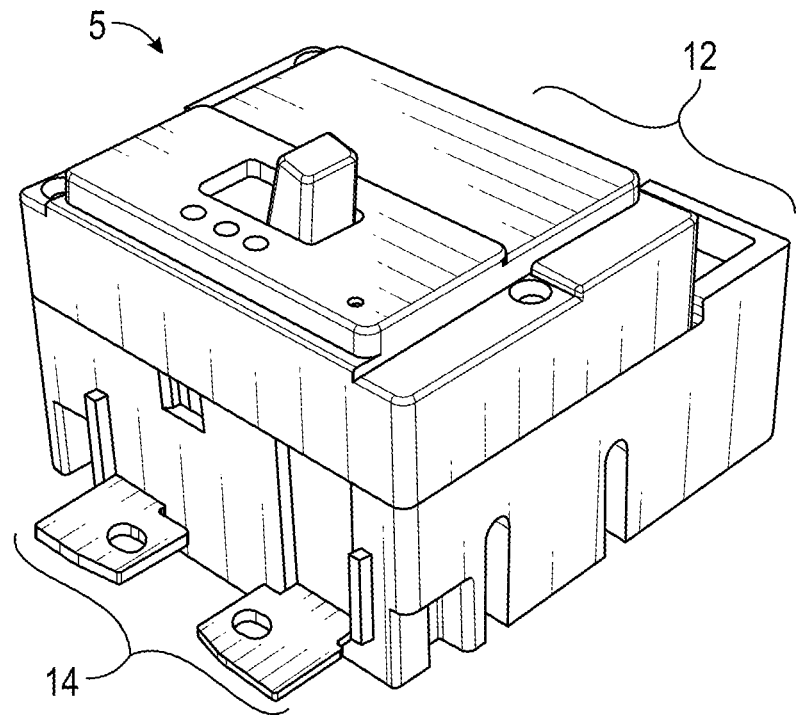
FIG. 5 is a perspective view a conventional main circuit breaker.
Figure 6:
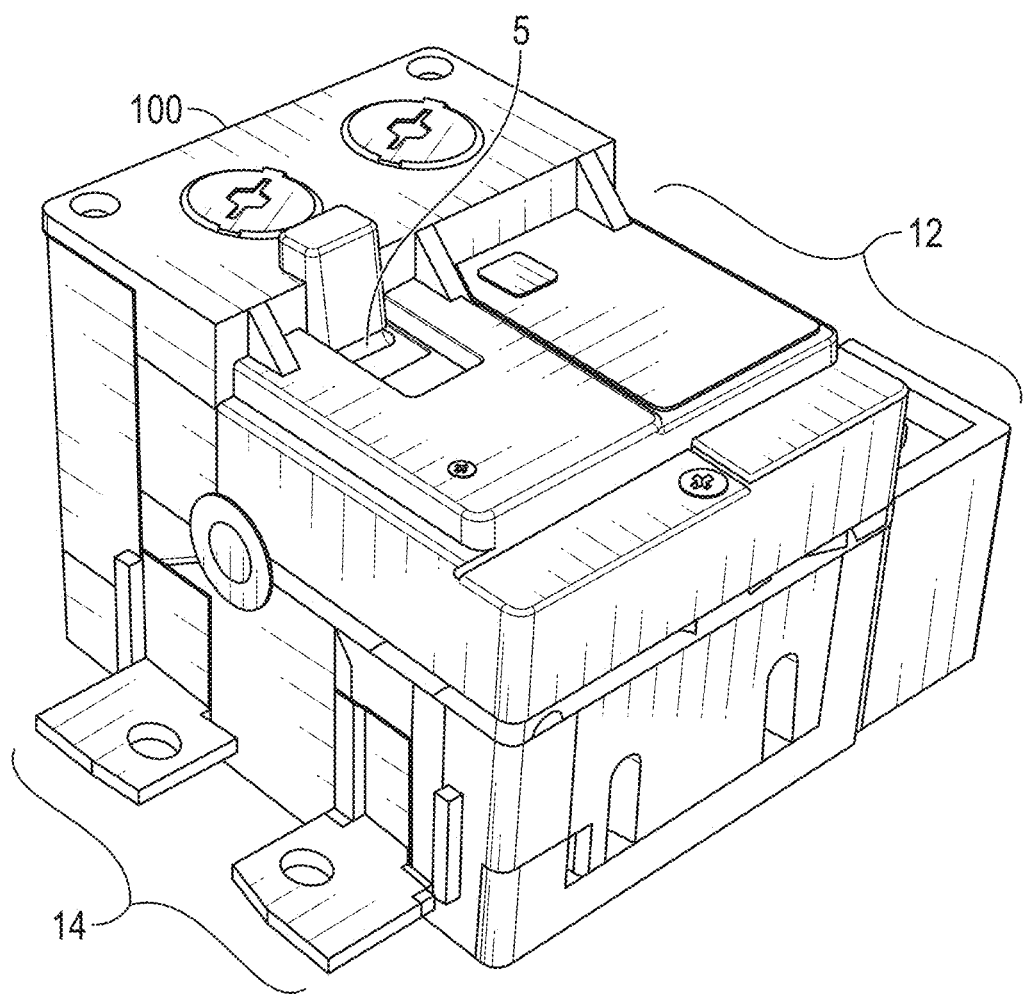
FIG. 6 is a perspective view depicting that the power sub-feed device of FIG. 2 has at least the same wiring structure as that of the conventional main circuit breaker of FIG. 3 in accordance with an example embodiment of the disclosed concept.

The power sub-feed device 100 includes a plurality of bus bars including a line bus bar and a load bus bar, a collar assembly attached to the plurality of bus bars, and a frame that receives the collar assembly and the plurality of bus bars and covers at least the collar assembly and the plurality of bus bars (see in FIGS. 7-10). The power sub-feed device 100 is coupled downstream to the meter 3 and has the same footprint (e.g., without limitation, wirings) as the main breaker 5 (as shown in FIGS. 4-6). The power sub-feed device 100 is disposed in a location in which the main breaker 5 was previously disposed in the main power panel 5 and wired to the line conductors and the load conductors in the same positions in which those of the main breaker 5 were previously wired. For example, the power sub-feed device 100 includes one or more line terminals 12 and one or more load terminals 14 at the same locations in which the main breaker 5 has its line terminals 12 and load terminals 14 as shown in FIGS. 5-6. The line terminals 12 of the power sub-feed device 100 are coupled to the power meter 3, which is coupled to the line conductors. The load terminals 14 of the power sub-feed device 100 are coupled to the load center 6. The power sub-feed device 100 also includes additional terminals: one or more power deviation terminals 16 coupled to the main breaker 5 and structured to deviate the primary power from the main power panel 10 to the main breaker 5 disposed in the secondary device 200, and one or more power reception terminals 17 coupled to a switch (e.g., a manual switch or an ATS) 210 disposed in the secondary device 200 and structured to feed the selected power upon, e.g., without limitation, a user input, back to the main power panel 10. As such, the power sub-feed device 100 converts the main power panel 10 into a main lug or wiring panel. In some example, the power sub-feed device 100 has the same temperature ratings as the main breaker 5 and the load center 6 do. In some examples, the power sub-feed device 100 has similar short circuit current ratings to work with the conventional main breakers or any future main breakers.

The secondary device 200 is connected to the main power panel 10 and includes the main breaker 5, which was previously disposed in the main power panel 10, and the switch 210, which is coupled to the main breaker 5 at a first end, the secondary power source 30 at a second end, and the power sub-feed device 100 at a third end. The switch 210 may include a power switching mechanism operable to selectively switch between the primary power source 20 and the secondary power source 30 to provide power to the loads 40 based at least in part on a user selection. The power switching mechanism may be composed, for example, of a first switch 212 that connects or disconnects the switch 210 to or from the main breaker 5 via a main breaker contactor and a second switch 214 that connects or disconnects the switch 210 to or from the secondary power source 30 via a secondary power source contactor. In some examples, the switch 210 may include one switch that connects or disconnects the switch 210 between the primary power source 20 or the secondary power source 30. The switch 210 also includes a controller (not shown) structured to control operation of the power switching mechanism and includes a logic or algorithm stored therein or in a memory. The logic or algorithm is configured to channel power selected from the primary power source 20 or the secondary power source 30.

In operation, the power sub-feed device 100 receives power from the primary power source 20 via the line terminals 12. Then, it feeds or deviates the primary power from the main power panel 10 to the main breaker 5 in the secondary device 200 via the power deviation terminals 16. The power sub-feed device 100 then receives power from the secondary device via the power reception terminal 17 based at least in part on a user selection of the primary power source 20 or the secondary power source 30 as a power supply source, and supplies the power from the selected power supply source to the loads 40 via the load terminal 14. If the user selects the primary power source 20 to supply power to the loads 40, the controller of the switch 210 causes the first switch 212 to close while causing the second switch 214 to be open and the switch 210 routes the primary power, which has been deviated from the main power panel 10 to the secondary device 200, back to the main power panel 10. The power sub-feed device 100 then receives the primary power from the switch 210 via the power reception terminals 17 and supplies the primary power to the loads 40 coupled to the load center 6 of the main power panel 10 via the load terminals 14. If the user selects the secondary power source 30 to supply to the loads 40, the controller causes the second switch 214 to close while causing the first switch 212 to open and the switch 210 channels power from the secondary power source 30 to the power sub-feed device 100 in the main power panel 10. The power sub-feed device 100 receives secondary power from the secondary power source 30 via the power reception terminals 17, and supplies the secondary power to the loads 40 via the load terminals 14.

Thus, by simply replacing the main breaker 5 with the power sub-feed device 100 in the main power panel 10, placing the main breaker 5 in the secondary device 200 upstream to the switch 210, and connecting the power sub-feed device 100 to the secondary device 200, the power sub-feed system 1 simplifies retrofitting of the main power panel 10 to have access capability to the secondary power source 30 without having to expend significant resources and costs that would be otherwise required. In addition, by placing the main breaker 5 upstream to the switch 210, the power sub-feed system 1 allows the main breaker 5 to provide protection to all of the loads 40 coupled downstream to the main breaker 5, i.e., all of the loads 40 coupled to the load center 6 of the main power panel 10. As such, in an event of a fault (e.g., a large overload), the main breaker 5 will trip and protect all of the loads 40 coupled to the load center 6 regardless of which power source has been selected.

Figure 2:
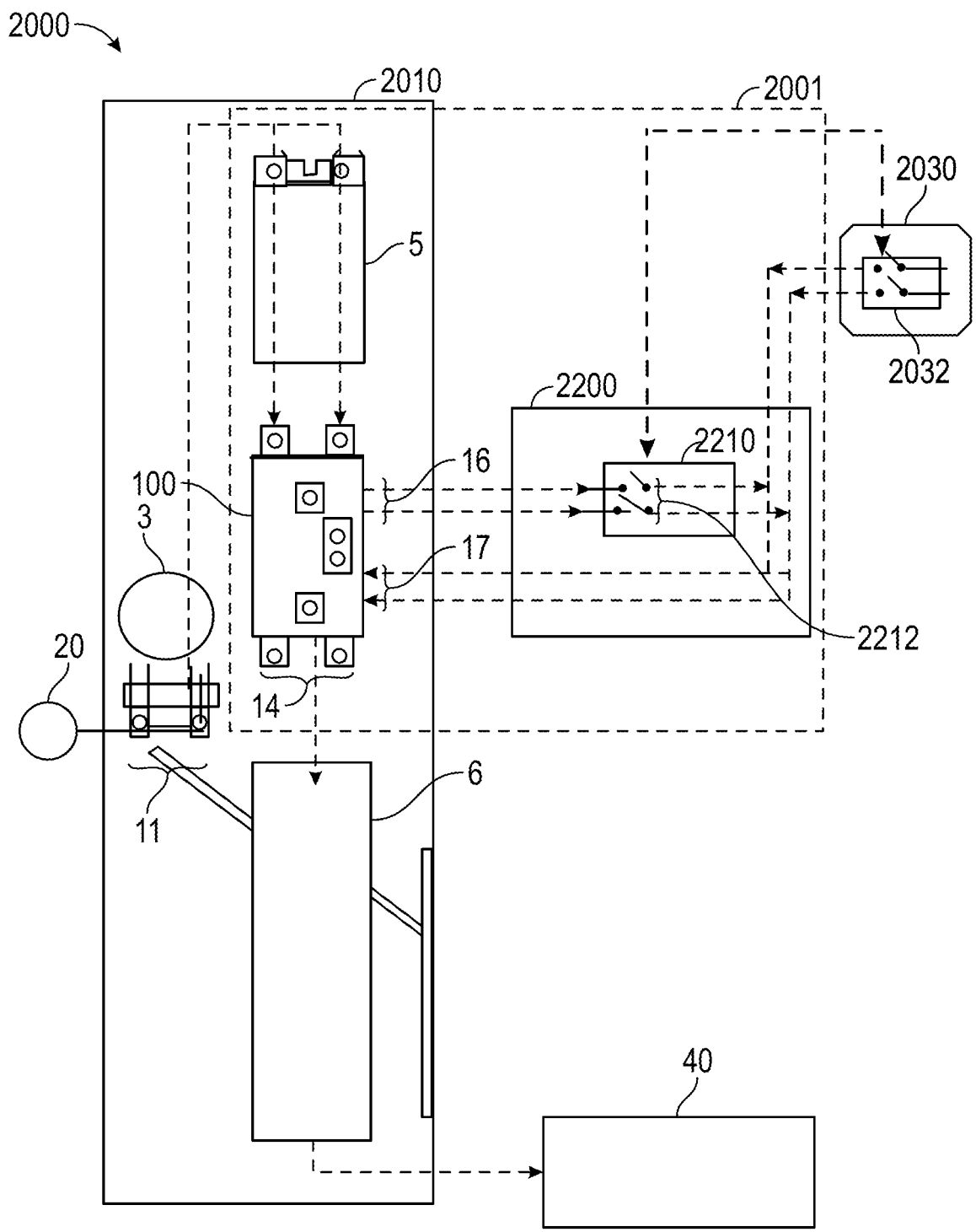
FIG. 2 is a diagram of a power system in accordance with an example embodiment of the disclosed concept.

FIG. 2 illustrates a diagram of a power distribution system 2000 in accordance with an example embodiment of the disclosed concept. The power distribution system 2000 is similar to the power distribution system 1000 of FIG. 1 except in that the main power panel 2010 includes the power sub-feed device 100 directly coupled downstream from the main breaker 5 within the main power panel 2001, and that the second panel 2200 does not include the main breaker 5 but includes a switch (e.g., a manual switch or an ATS), which is coupled to the power deviation terminals 2016 and power reception terminals 2017 of the power sub-feed device. As such, the power deviation terminals 16 are directly coupled to one end of the switch 2210 and the power reception terminals 17 are coupled to another end of the switch 2210. If the primary power source 20 is to supply power to the loads 40, then the switch 2212 closes and the switch 2210 channels the deviated primary power back to the power sub-feed device 2100. The power sub-feed device 100 receives the primary power back via the switch 2210 and the power reception terminals 17 and supplies the primary power to the loads 40 via the load terminals 14. If the secondary power source 2030 is to supply power to the loads 40, then the switch 2031 opens and the switch 2032 coupled to the switch 2212 closes. The switch 2210 then channels the secondary power from the secondary power source 2030 to the power sub-feed device 100, which in turn receives the secondary power via the switch 2210 and the power reception terminals 17 and supplies power to the loads 40 via the load terminals 14.

Figure 3:
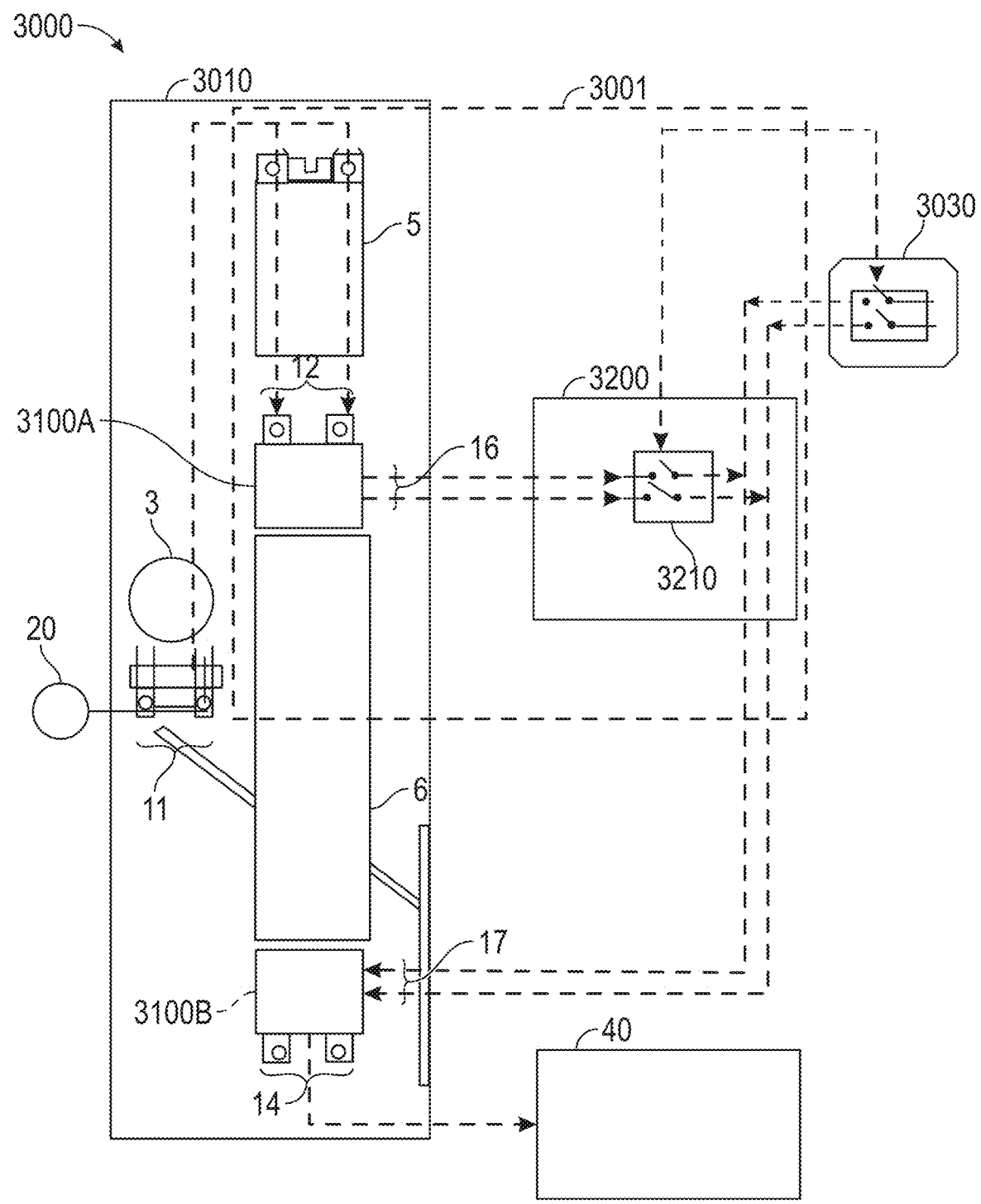
FIG. 3 is a diagram of a power system in accordance with an example embodiment of the disclosed concept.

FIG. 3 illustrates a diagram of a power distribution system 3000 in accordance with an example embodiment of the disclosed concept. The power distribution system 3000 is similar to the power distribution system 2000 of FIG. 2 except in that the power sub-feed device is divided into two separate parts 3100A and 3100B to accommodate a situation in which the main power panel includes less room between the main breaker 5 and the load center 6. The first part 3100A of the power sub-feed device is disposed at one portion of the main power panel 3010 and the second part 3100B is disposed at another portion of the main power panel 3010. For example, the first part 3100A is disposed immediately below the main breaker 5, and includes the line terminals 12 and the power deviation terminals 16. The line terminals 12 of the power sub-feed device are coupled to the main breaker 5 and the power deviation terminals 16 are coupled directly to one end of the switch 3210. And the power reception terminals 17 are coupled to another end of the switch 3210 and the load terminals 14 are coupled to the loads 40. As such, the first part 3100A is coupled downstream from the main breaker 5 and upstream to the switch 3210. The second part 3100B of the power sub-feed device is disposed below the load center 6 and includes the power reception terminals 16 and the load terminals 14. As such, the second part 3100B is coupled also downstream to the main breaker 5 and the switch 3210.

FIGS. 4-10 illustrate that the power sub-feed device 100 of FIGS. 1-2 has the same footprint (e.g., wiring terminals and dimensions) as the main breaker 5 according to an example embodiment of the disclosed concept. FIG. 4 is a perspective view of the power sub-feed device 100 having line terminals 12 and load terminals 14 in addition to the power deviation terminals 16 coupled to the main breaker 5 and power reception terminals 17 coupled to the switch 210,2210 in the secondary device 200,2200. FIG. 5 is a perspective view of a conventional main breaker 5 utilized in a main power panel 10 of residential and/or commercial facilities. The main circuit breaker 5 includes line terminals 12, power deviation terminals 16, power reception terminals 17, and load terminals 14. FIG. 6 is a perspective view showing that the power sub-feed device 100 has the same line and load terminals 12,14 at the same positions as the main circuit breaker 5 does. Thus, when replacing the main breaker 5 with the power sub-feed device 100 as described with reference to FIG. 1, such replacement is achieved by simply removing the main breaker 5 from the main power panel 10 and installing the power sub-feed device 100 in the exact location in which the main breaker 5 was previously disposed. When connecting the power sub-feed device to the main breaker 5 within the main power panel as described with reference to FIG. 2, the power sub-feed device is connected directly to the main breaker 5 via the line terminals 12 and to the load center 6 to via the load terminals 14. The power deviation terminals 16 and power reception terminals 17 are coupled to respective ends of the switch 2210. While FIGS. 4-13 illustrate the power sub-feed device 100 in one single piece, the power sub-feed device may include at least two parts in order to accommodate limited space within the main power panel as described with reference to FIG. 3. In such examples, the power sub-feed device may be divided into two parts 3100A,3100B and its structure and configuration may be adjusted accordingly as described with reference to FIG. 3

Figure 7:
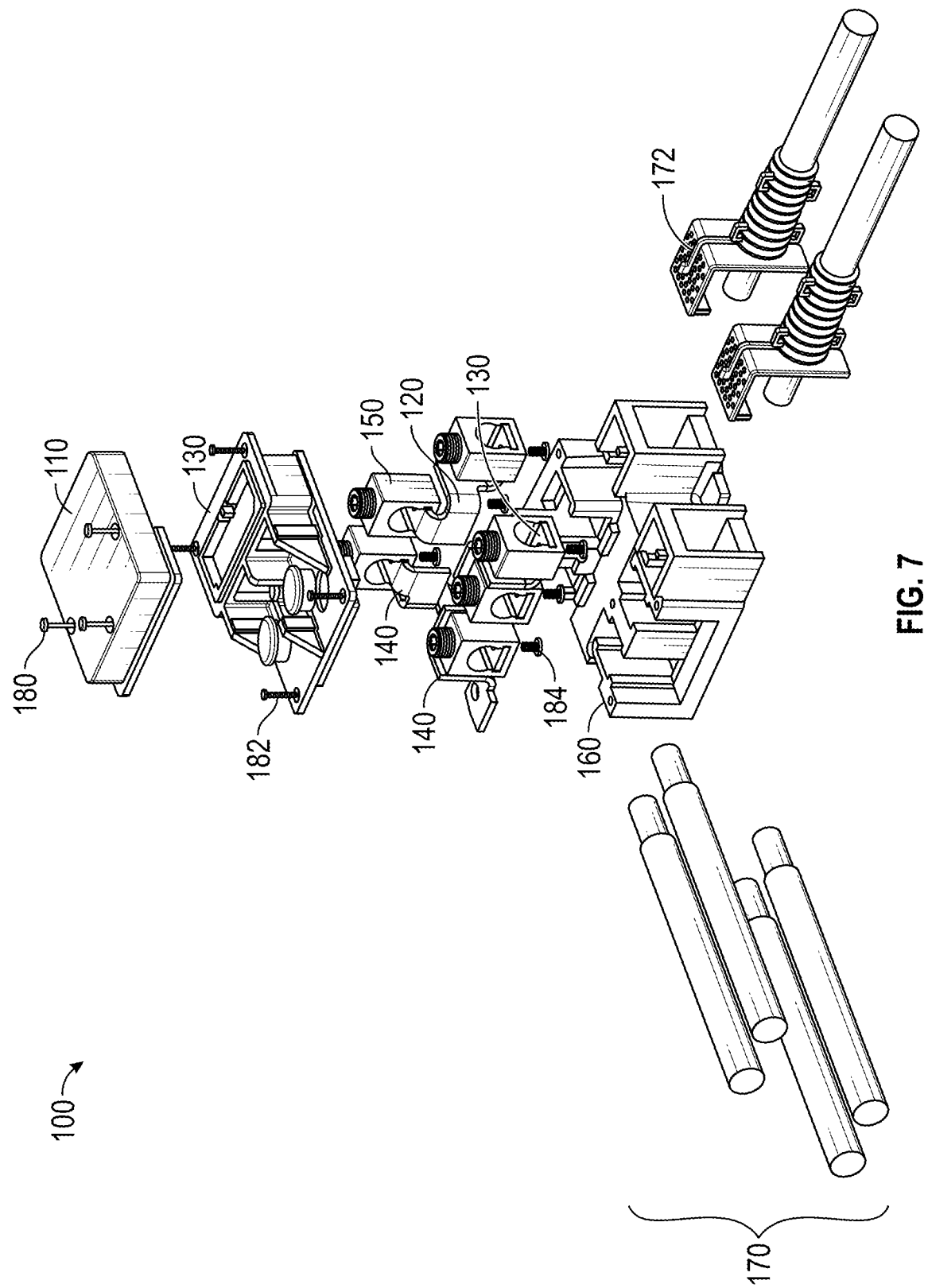
FIG. 7 is an exploded view of components of a power sub-feed device in accordance with an example embodiment of the disclosed concept.
Figure 12:
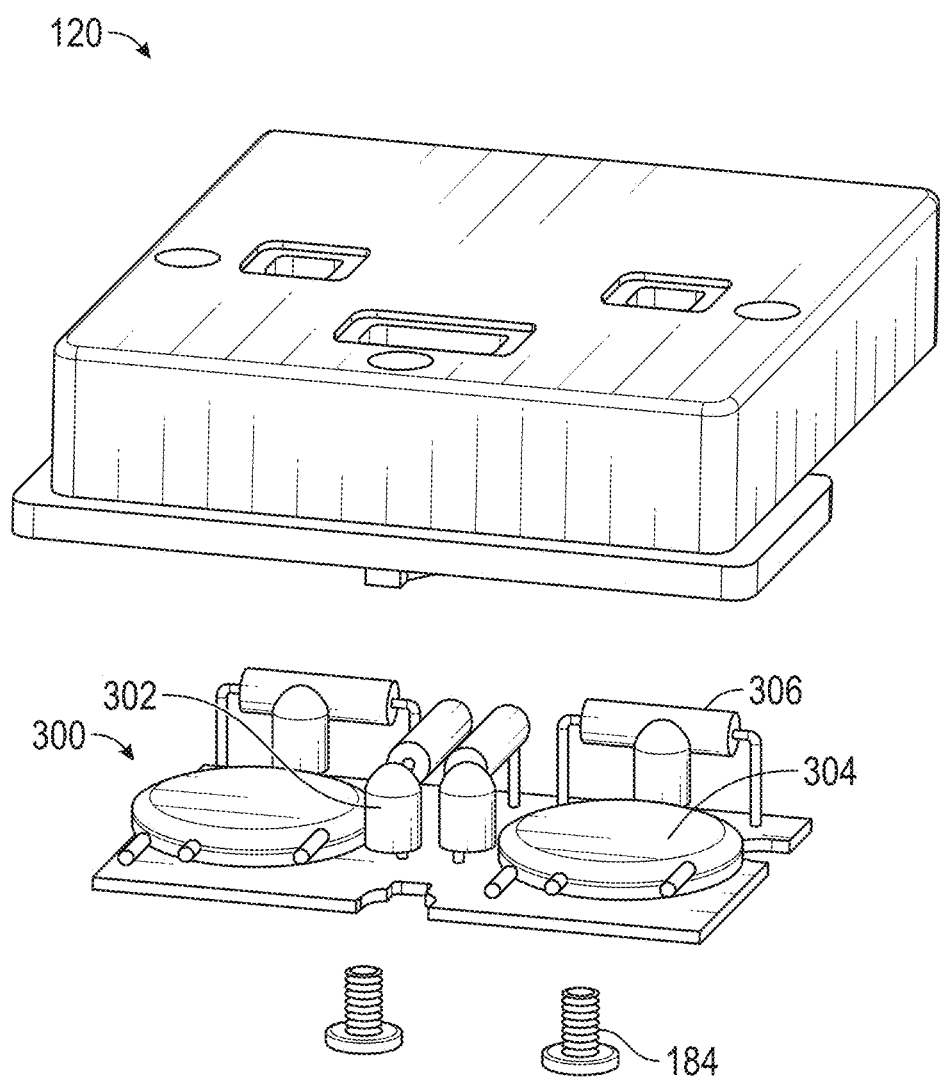
FIG. 12 is a perspective view of the top cover of FIG. 9 and a voltage surge protector in accordance with an example embodiment of the disclosed concept.
Figure 13:
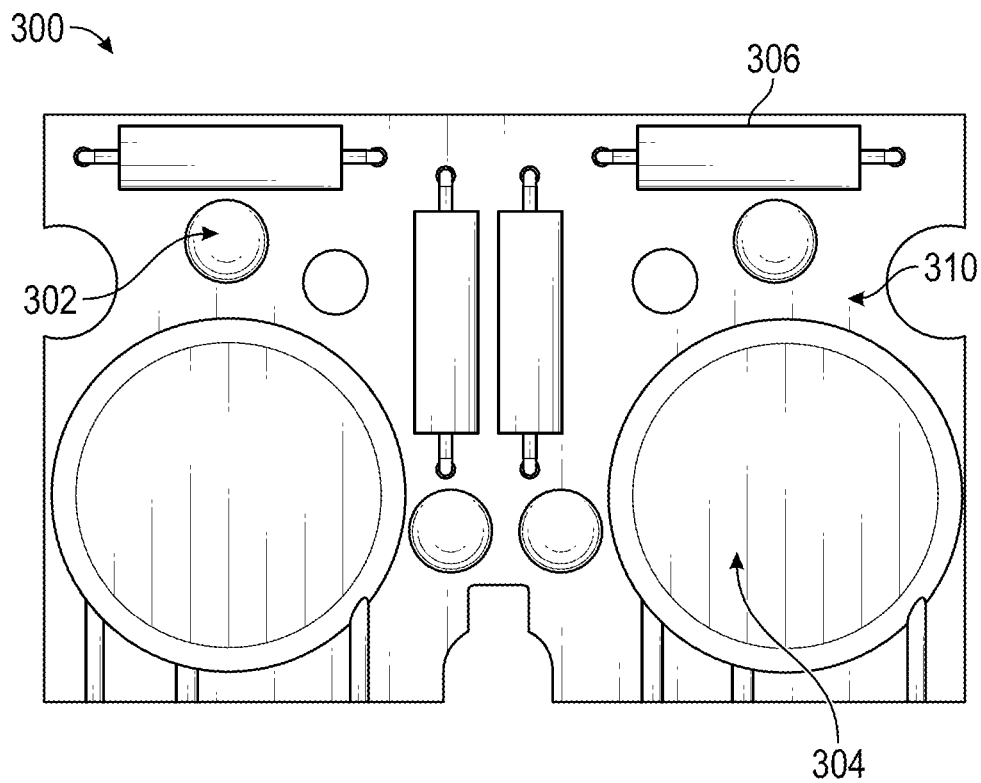
FIG. 13 is a view of a voltage surge protector included within a power sub-feed device in accordance with an example embodiment of the disclosed concept.

FIG. 7 illustrates an exploded perspective view depicting components of the power sub-feed device 100 of FIGS. 1-2 according to an example embodiment of the disclosed concept. The power sub-feed device 100 includes a top cover 110, a middle cover 130, a collar assembly 150 and bus bars 120, 140, a base 160 and cables 170. The top cover 110, the middle cover 130 and the base 160 are made of rigid materials such as thermoplastic. The top cover 110 or other parts of the power sub-feed device 100 may include a voltage surge protector 300 (as shown in FIGS. 12 and 13) and one or more openings for indicators 302 structured to show, e.g., without limitation, a power status indicating which power source is supplying power or whether the power is being supplied in general, or a condition or status of the voltage surge protector 300 indicating whether the voltage surge protector 300 is operating in good condition such that the power distribution system 1000,2000 is indeed protected against voltage surge, or has been exhausted. In some examples, the top cover 110 or other parts of the power sub-feed device 100 may also include voltage and/or current sensors to sense line and/or load current) and include indicators for voltage surge or overcurrent based on the sensed voltage and/or current. The top cover 110 is attached to the middle cover 130 via first connecting elements 180 (e.g., without limitation, screws having a length of 1.078 to 1.125 inches). The top cover 110 covers the terminals 12, 16, 17 so that the terminals are no longer exposed for possibly electrocuting anyone who may come in contact with the terminals. The middle cover 130 is attached to the base 160 via second connecting elements 182 (e.g., without limitation, screws having a length of 0.75 inches). The middle cover 130 holds the collar assembly 150 in place. In some examples, the middle cover 130 includes an isolation cap locking component 137 (as shown in FIGS. 9B-C). The locking component 137 may include a lock/unlock selector button. The collar assembly 150 are attached to the line and load bus bars 120, 140 via third connecting elements 184

(e.g., without limitation, screws having a length of 0.25 inches). The cables 170 (e.g., without limitations, wires) are then connected to corresponding terminals. In some examples, the cables 170 are equipped with collar assembly protector 172. In some examples, the power sub-feed device 100 may include protective accessories, e.g., with limitation, lug hats, rubber boots, etc. In some examples, the power sub-feed device 100 with an unassembled cover 110 and the collar assembly 150 and bus bars 120, 140 assembled in the base 160 and covered by the middle cover 130 assembled together may be shipped to a user for installation with the secondary device 200. The power sub-feed device 100, when assembled, includes the plurality of terminals 12, 14, 16, and 17 as previously discussed with reference to FIG. 1.

FIGS. 8A-C illustrate a frame of the power sub-feed device 100 according to an example embodiment of the disclosed concept. The frame includes a top cover 110, a middle cover 130, and a base 160. FIGS. 8A-C illustrate frame components of the top cover 110 of a power sub-feed device as shown in FIG. 7 according to an example embodiment of the disclosed concept. The top cover 110 includes an upper frame 112, a side frame 114 and a bottom frame 116, each made of rigid material, e.g., without limitation, thermoplastic. It will be understood that the frames of the top cover 110 of FIGS. 8A-C are for illustrative purposes only and the top cover 110 may have different features, components, or dimensions depending on the circumstances, needs or user preferences. The top cover 110 is structured to be attached to the middle cover 130, thereby covering the terminals 12, 16, 17 and protecting the user from possible electrocution.

Figure 9A:
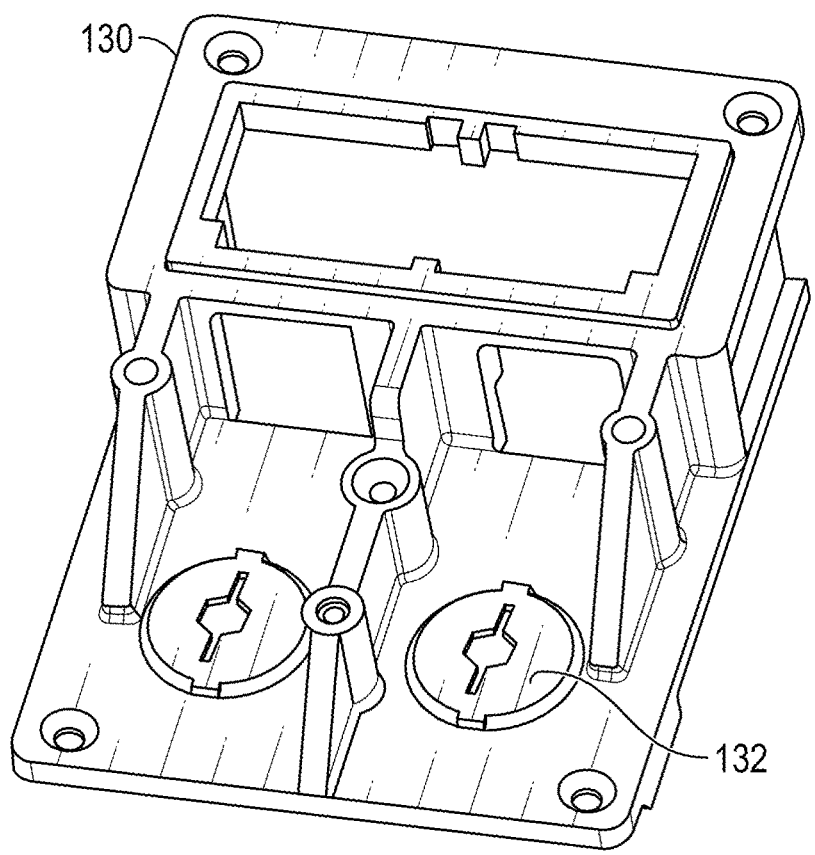
FIGS. 9A-C illustrate a middle cover of a power sub-feed device in accordance with an example embodiment of the disclosed concept.
Figure 9B:
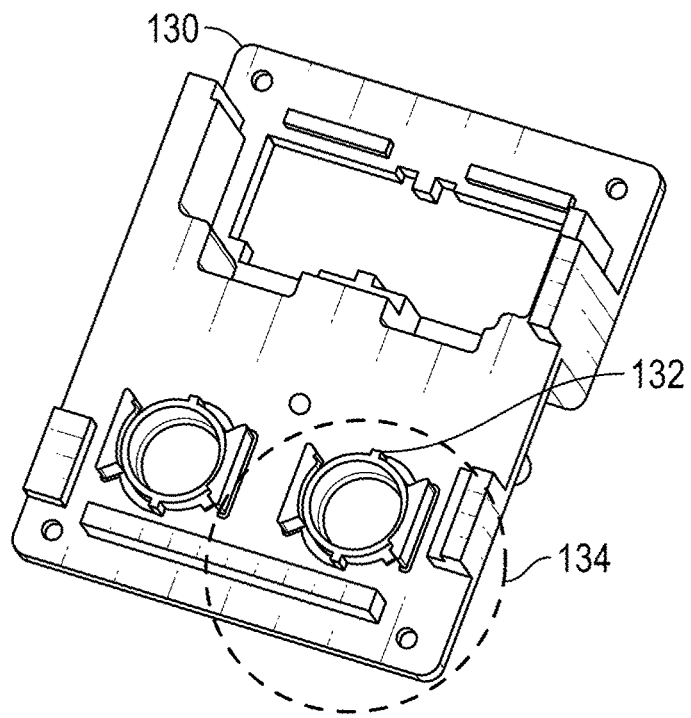
Figure 9C:
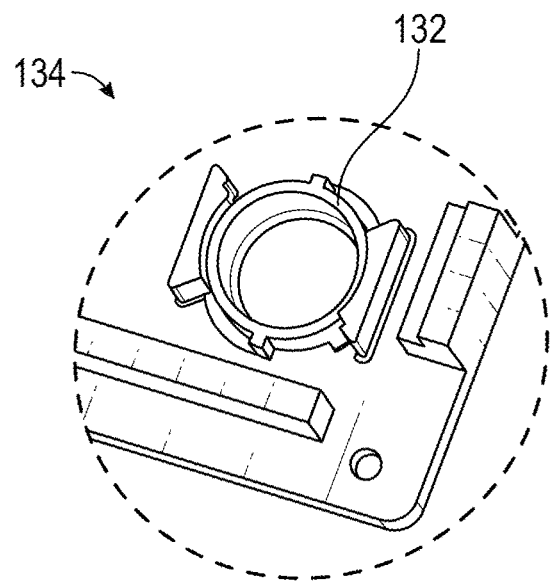

FIGS. 9A-C illustrate the middle cover 130 of a power sub-feed device as shown in FIG. 7 according to an example embodiment of the disclosed concept. FIG. 9A is a perspective top view of the middle cover 130 including an isolation cap locking component 132. FIG. 9B is a view of the bottom of the middle cover 130, depicting, among others, the bottom view of the isolation cap locking component 132. FIG. 9C is an enlarged view of a portion 134 of the middle cover 130 viewed from the bottom, depicting the isolation cap locking component 132. It will be understood that the components of the middle cover 130 of FIGS. 9A-C are for illustrative purposes only and the middle cover 130 may have different features, components, or dimensions depending on the circumstances, needs or user preferences.

Figure 10:
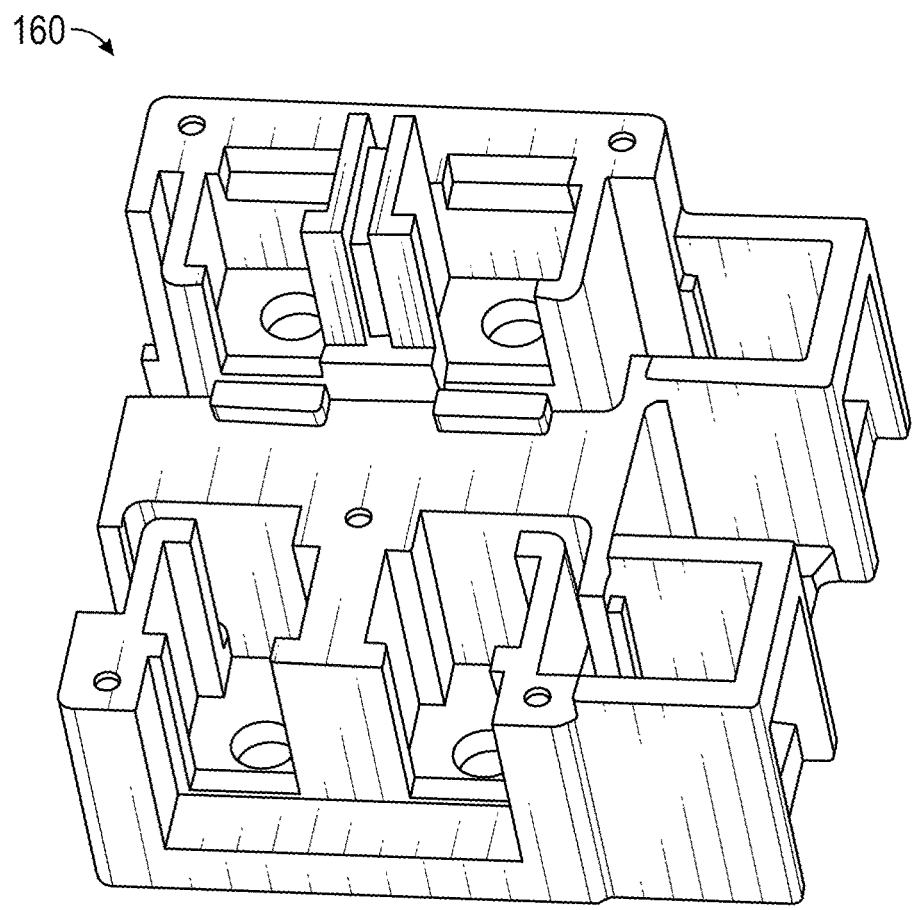
FIG. 10 is a base of a power sub-feed device in accordance with an example embodiment of the disclosed concept.

FIG. 10 is a perspective view of the base 160 of a power sub-feed device 100 as shown in FIG. 7 according to an example embodiment of the disclosed concept. The collar assembly 150 attached to the line and load bus bars 120 and 140 as shown in FIG. 7 is assembled in the base 160.

Figure 11:
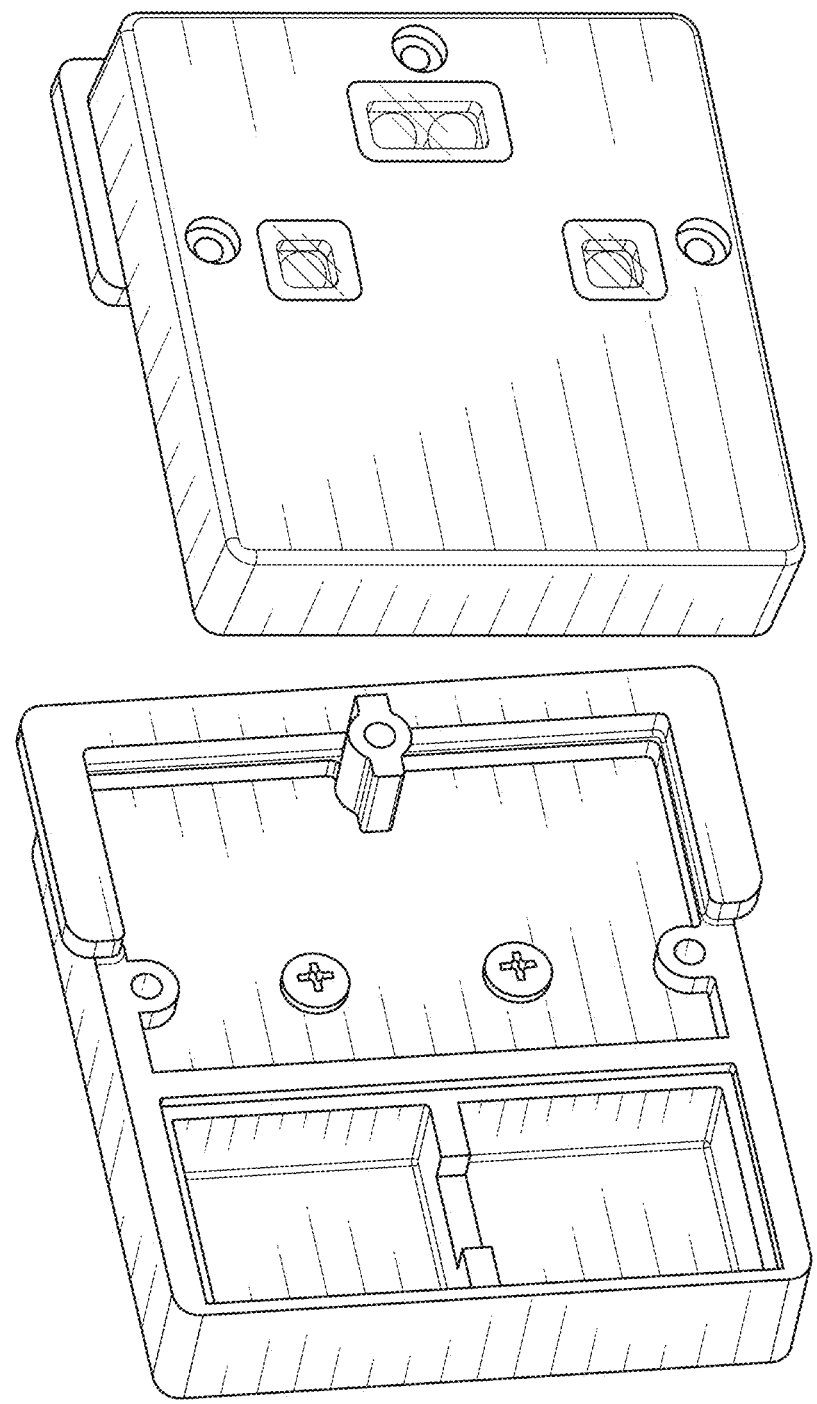
FIG. 11 is a perspective view of a top cover of a power sub-feed device in accordance with an example embodiment of the disclosed concept.

FIGS. 11-13 illustrate an example voltage surge protector 300 according to an example embodiment of the disclosed concept. The voltage surge protector 300 may include a printed circuit board having one or more metal oxide varistors 304 and one or more power resistors or fuses 306, structured to protect the power distribution system 1000, 2000 against voltage surges. In some examples, the voltage surge protector 300 may include an indicator 302 (e.g., without limitation, an LED) structured to indicate status of the voltage surge protector 300 (e.g., whether the voltage surge protector 300 is operating normally or has been exhausted). In some examples, the voltage surge protector 300 may also include an indicator 302 that indicates which power source is being utilized to supply power to the loads 40 or whether the power in general is being supplied to the power distribution system 1000, 2000. While the voltage surge protector 300 as shown in FIGS. 11-13 is disposed within the top cover 110 of the power sub-feed device 100, however, it will be understood that the voltage surge protector 300 may be disposed in any other parts (e.g., the middle cover 130, the base 160, etc.) of the power sub-feed device 100. Further, the components of the voltage surge protector 300 as shown in FIGS. 11-13 are for illustrative purposes only, and may have different features, components, or configurations depending on the circumstances, needs or user preferences. For the power sub-feed device including at least two separate parts as described with reference to FIG. 3, a voltage surge protector 300 may be included in each separate part together with respective the indicator 302.

Figure 14:
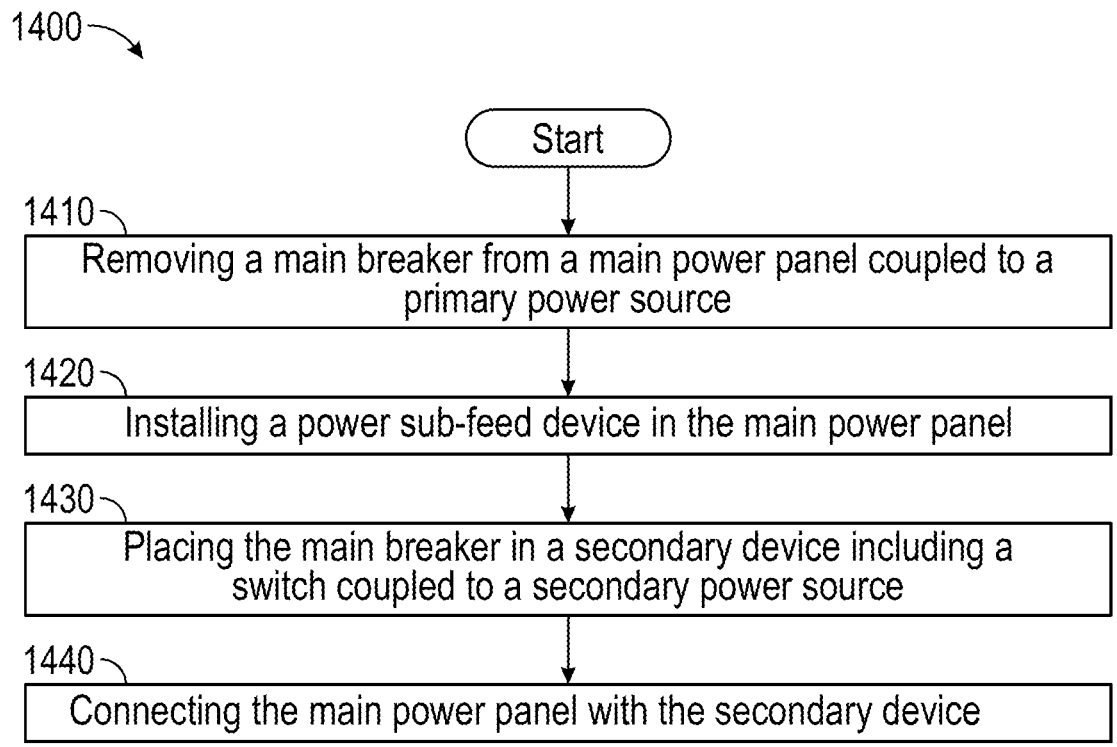
FIG. 14 is a flow chart of a method of installing a power sub-feed device to a conventional main power panel in accordance with an example embodiment of the disclosed concept.

FIG. 14 is a flow chart for a method 1400 of adding a secondary power source 30 to a conventional main power panel 10 of a power distribution system 1000 according to an example embodiment of the disclosed concept. The method 1400 may be performed by a user (e.g., an electrician, a field engineer, etc.).

At 1410, a user may remove a main breaker from a main power panel coupled to a primary power source. The main breaker may be any existing, conventional main breaker or any future main breaker having the same or similar wiring footprint, short circuit current rating, and/or temperature rating as the conventional main breaker.

At 1420, the user installs a power sub-feed device in the main power panel. The power sub-feed device replaces a main breaker of the main power panel and converts the main power panel to a main lug or wiring panel.

At 1430, the user places the main breaker in a secondary device including a switch (e.g., without limitation, a manual switch(es) or an automatic transfer switch (ATS)) coupled to a secondary power source. The switch is structured to selectively switch between the primary power source and the secondary power source (e.g., a solar panel, an energy storage system, etc.) based at least in part on a user input. The main breaker may be connected upstream to the switch.

At 1440, the user connects the main power panel with the secondary device. Particularly, the user connects the power sub-feed device disposed within the main power panel to the main breaker now disposed in the secondary device, connects the switch to the secondary power source, and then connects the switch to the power sub-feed device. Upon retrofitting of the power distribution system, the power sub-feed device feeds or deviates the primary power to the secondary device, the user selects either the primary power source or the secondary power source for providing power to the loads, and the power sub-feed device receives power from a selected power source via the switch and provides the power to the load center in the main power panel.

For the embodiments including the power sub-feed device within the main power panel as described with reference to FIGS. 2-3, steps 1410-1430 are skipped, and 1440 is replaced with simple steps of connecting the power sub-feed device downstream from the main breaker within the main power panel, upstream to the switch in the second panel, and then to the load.

Figure 15:
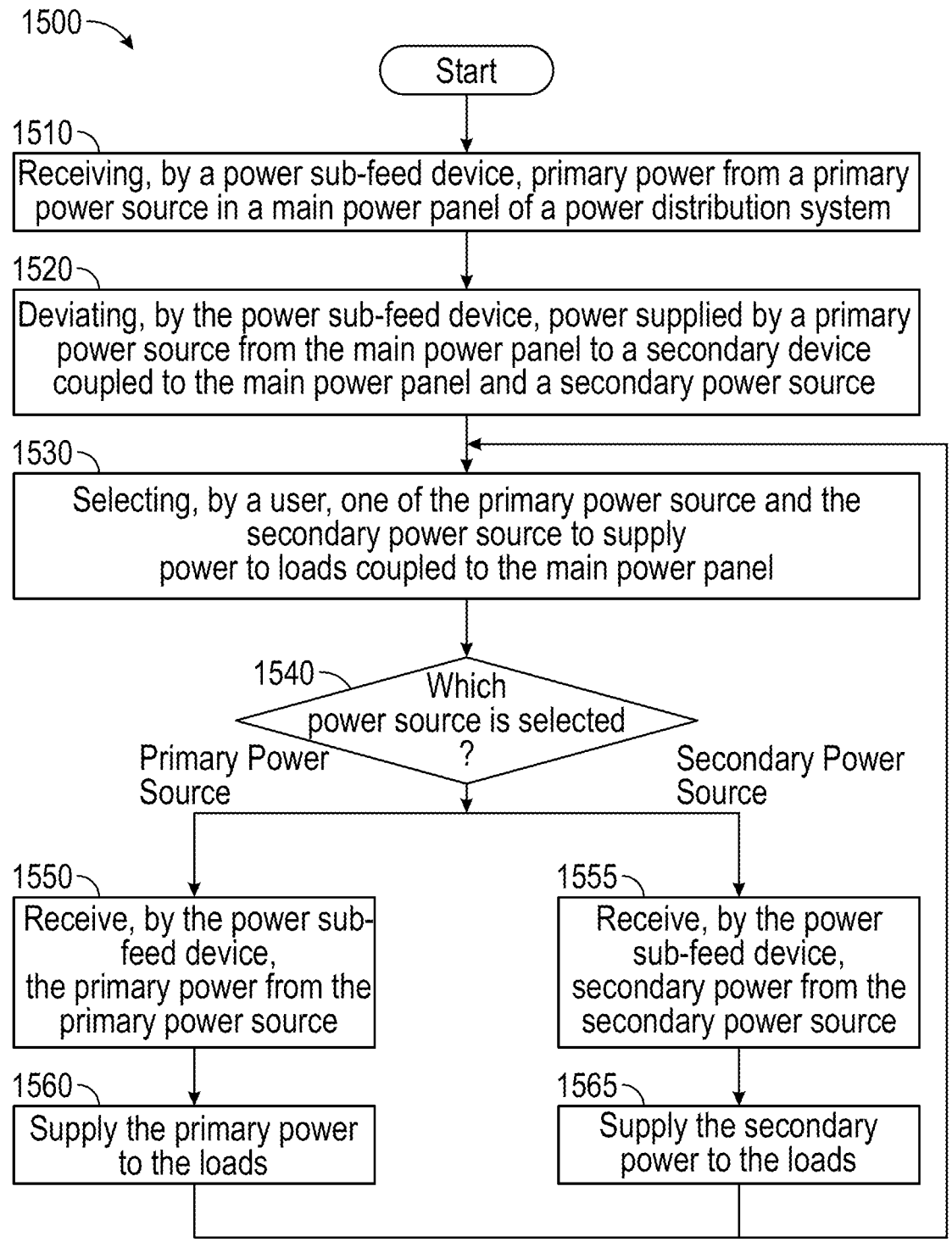
FIG. 15 is a flow chart of a method of distributing power using a power sub-feed system in accordance with an example embodiment of the disclosed concept.

FIG. 15 is a flowchart for a method 1500 of distributing power in a power distribution system according to an example embodiment of the disclosed concept. The power distribution system may be the power distribution system 1000, 2000, 3000 as described with reference to FIGS. 1-3. The method 1500 may be performed by the power sub-feed system 1, 2001, 3001 of the power distribution system 1000 as described with reference to FIGS. 1-3) components thereof (e.g., the power sub-feed device 100 or the switch 210 (e.g., without limitation, via a controller or a logic stored in the controller or a memory of the switch 210)).

At 1510, the power sub-feed device receives primary power from a primary power source.

At 1520, the power sub-feed device deviates the primary power from a main power panel to a secondary device via a power deviation terminal of the power sub-feed device, the secondary device coupled to the main power panel and including at least a switch (e.g., without limitation, a manual switch(es) or an automatic transfer switch (ATS)) coupled to a secondary power source. In some examples, if there is a power outage, this step does not occur.

At 1530, a user selects the primary power source or the secondary power source as a power supply source to supply power to loads coupled to the main power panel. The user may select the power source manually, digitally, or wirelessly using a control mechanism (internal or remote) of the switch. If there is a power outage, this step may be skipped.

At 1540, the switch (e.g., without limitation, a controller of the switch or a logic or algorithm stored in a memory or the controller) determines which power source (i.e., the primary power source or the secondary power source) is selected as the power supply source. If the primary power source is selected, the method 1500 proceeds to 1550. If the secondary power source is selected, the method 1500 proceeds to 1555.

At 1550, the power sub-feed device receives primary power from the primary power source. The switch may include a first switch and a second switch. If it is determined that the primary power source has been selected, a logic algorithm stored in the switch causes the first switch coupled to the power deviation terminal to close and the second switch coupled to the secondary power source to open. The switch then channels the primary power back to the main power panel. If the secondary power source is selected, the switch then causes the first switch coupled to the power deviation terminal to open and close the second switch coupled to the secondary power source. At 1560, the power sub-feed device supplies the primary power to the loads. That is, the main breaker sub-feed supplies the primary power to the loads received from the switch via the power reception terminal. The method 1500 then proceeds to 1565.

At 1555, the power sub-feed device receives secondary power from the secondary power source. If it is determined that the secondary power source has been selected, a logic algorithm stored in the switch causes the switch coupled to the power deviation terminal to open and the switch coupled to the secondary power source to close. The switch then channels the secondary power to the main power panel. At 1560, the power sub-feed device supplies the secondary power to the loads via the power reception terminal.

Figure 16:
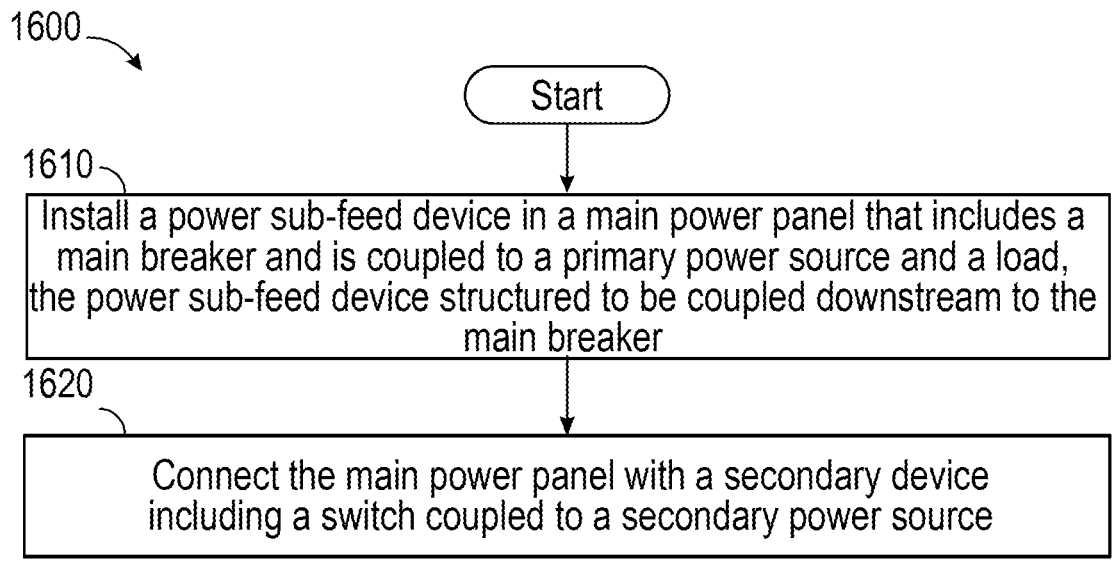
FIG. 16 is a flow chart of a method of installing a power sub-feed device to a conventional main power panel in accordance with an example embodiment of the disclosed concept.

FIG. 16 is a flow chart for a method 1600 of adding a secondary power source 2030 to a main power panel 2010 of a power distribution system 2000 as described with reference to FIG. 2 according to an example embodiment of the disclosed concept. The method 1600 may be performed by a user (e.g., an electrician, a field engineer, etc.).

At 1610, the user installs a power sub-feed device 100 in the main power panel 2010 that includes a main breaker 5 and is coupled to a primary power source 20 and a load 40. The user connects the power sub-feed device 100 downstream to the main breaker 5. In some examples, the power sub-feed device 100 is disposed adjacent to or immediately below the main breaker 5 within the main power panel 2010. The power sub-feed device 100 includes a plurality of terminals including line terminals 12, power deviation terminals 16, power reception terminals, and load terminals 14. The line terminals 12 of the power sub-feed device 100 are coupled to the main breaker 5 and receive primary power from the primary power source 20.

At 1620, the user connects the main power panel 2010 with a secondary device 2200 coupled to a secondary power source 2030. The secondary device 2200 may be a secondary power panel and include a switch 2210. The switch 2210 may include a manual switch(es) or an automatic transfer switch (ATS) 2212 and is coupled to a secondary power source 2030. The manual switch or the ATS is coupled to a switch disposed within the secondary power source 2030. The power deviation terminals 16 of the power sub-feed device 100 are coupled to a first end of the switch 2210 and structured to deviate primary power received from the primary power source 20 to the secondary device 2200. Upon a user selection of the primary power source or the secondary power source as a power supply source, the switch 2210 selectively switches to the selected power supply source and transmits power from the selected power supply source to the power reception terminals 17 of the power sub-feed device 100. The power sub-feed device 100 receives the power via the power reception terminals 17 from the secondary device 2200 and supplies power to the load 40 via the load terminals 14.

Figure 17:
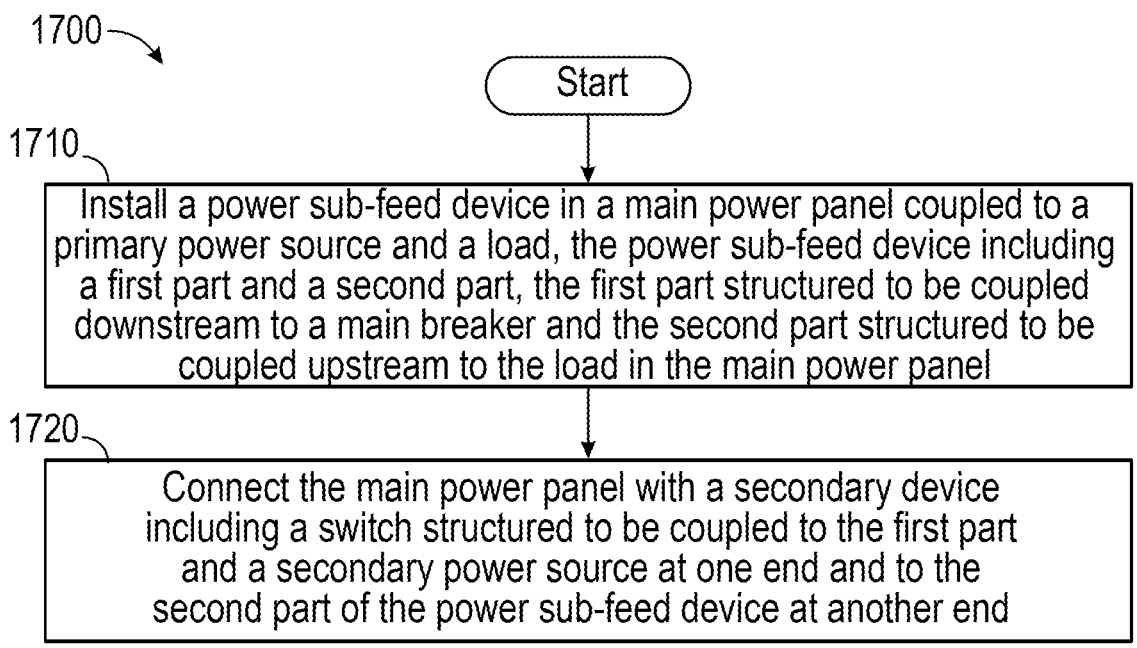
FIG. 17 is a flow chart of a method of installing a power sub-feed device to a conventional main power panel in accordance with an example embodiment of the disclosed concept.

FIG. 17 is a flow chart for a method 1700 of adding a secondary power source 3030 to a main power panel 3010 of a power distribution system 3000 as described with reference to FIG. 3 according to an example embodiment of the disclosed concept. The method 1700 may be performed by a user (e.g., an electrician, a field engineer, etc.).

At 1710, the user installs a power sub-feed device in the main power panel 2010 that includes a main breaker 5 and is coupled to a primary power source 20 and a load 40. The power sub-feed device includes a first part 3100A and a second part 3100B. The first part 3100A includes at least line terminals 12 and power deviation terminals 16. The second part 3100B includes at least load terminals 14 and power reception terminals 17. The user connects the first part 3100A of the power sub-feed device downstream to the main breaker 5. Particularly, the user connects the line terminals 12 of the first part 3100A to the main breaker 6. The first part 3100A of the power sub-feed device then receives primary power from the primary power source 20 via the main breaker 5.

At 1720, the user connects the main power panel 3010 with a secondary device 3200 coupled to a secondary power source 3030. The secondary device 3200 may be a secondary power panel and include a switch 2210. The switch 2210 may be a manual switch(es) or an automatic transfer switch (ATS) 2212 and is coupled to the secondary power source 3030. The switch is coupled to a switch disposed within the secondary power source 3030. The power deviation terminals 16 of the first part 3100A of the power sub-feed device are coupled to a first end of the switch 3210 and structured to deviate primary power received from the primary power source 20 to the secondary device 2200. Upon a user selection of the primary power source 20 or the secondary power source 3030 as a power supply source, the switch 2210 selectively switches to the selected power supply source and transmits power from the selected power supply source to the power reception terminals 17 of the second part 3100B of the power sub-feed device. The power sub-feed device receives the power via the power reception terminals 17 from the secondary device 3200 and supplies power to the load 40 via the load terminals 14.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A power sub-feed device, comprising:
   a plurality of bus bars comprising a line bus bar and a load bus bar;
   a plurality of terminals including a line terminal, a power deviation terminal, a power reception terminal, and a load terminal;
   a collar assembly attached to the plurality of bus bars;
   a frame that receives the collar assembly and the plurality of bus bars and covers at least the collar assembly and the plurality of bus bars,
   wherein the power sub-feed device is structured to be disposed within a main power panel coupled to a primary power source and a secondary device, receive primary power from the primary power source, deviate the primary power received to the secondary device via the power deviation terminal, the secondary device including at least a switch that is coupled to a secondary power source and structured to selectively switch between the primary power source and the secondary power source based at least in part on a user selection of the primary power source or the secondary power source as a power supply source, receive power from the secondary device via the power reception terminal, and supply the power from the selected power supply source to a plurality of loads coupled to the main power panel via the load terminal.

2. The power sub-feed device of claim 1, wherein the power sub-feed device is further structured to replace a main breaker disposed in the main power panel, and the secondary device is structured to receive the main breaker that has been replaced by the power sub-feed device.

3. The power sub-feed device of claim 2, wherein the line terminal of the power sub-feed device is structured to be coupled to the primary power source and the power deviation terminal of the power sub-feed device is structured to be coupled to the main breaker disposed in the secondary device, and the switch is further structured to be coupled downstream from the main breaker at one end and the power reception terminal at another end.

4. The power sub-feed device of claim 3, wherein the power sub-feed device deviates the primary power from the main power panel to the main breaker via the power deviation terminal.

5. The power sub-feed device of claim 1, wherein the power sub-feed device is further structured to be coupled downstream from the main breaker disposed within the main power panel, and the switch is structured to be coupled downstream from the main breaker.

6. The power sub-feed device of claim 5, wherein the line terminal of the power sub-feed device is coupled to the main breaker, the switch is coupled directly to the power deviation terminal at one end and the power reception terminal at another end.

7. The power sub-feed device of claim 6, wherein the power sub-feed device deviates the primary power to the secondary device via the power deviation terminal directly coupled to the one end of the switch.

8. The power sub-feed device of claim 2, wherein the power sub-feed device comprises at least two separate parts structured to be disposed at separate locations within the main power panel, the two separate parts including at least a first part and a second part, the first part including the line terminal and the power deviation terminal and the second part including the power reception terminal and the load terminal.

9. The power sub-feed device of claim 8, wherein the line terminal is structured to be coupled to the main breaker, the power deviation terminal is structured to be coupled to one end of the switch, the power reception terminal is structured to be coupled to another end of the switch, and the load terminal is structured to be coupled to the load.

10. The power sub-feed device of claim 1, wherein the switch comprises a manual switch or an automatic transfer switch.

11. The power sub-feed device of claim 1, further comprising:
    a voltage surge protector structured to protect the plurality of loads.

12. The power sub-feed device of claim 11, further comprising:
    an indicator structured to indicate at least one of a condition of the voltage surge protector or a power status.

13. A power sub-feed device system, comprising:
    a power sub-feed device structured to be disposed in a main power panel coupled to a primary power source and a load, the power sub-feed device comprising:
        a plurality of bus bars comprising a line bus bar and a load bus bar;
        a plurality of terminals including a line terminal, a power deviation terminal, a power reception terminal, and a load terminal;
        a collar assembly attached to the plurality of bus bars; and
        a frame that receives the collar assembly and the plurality of bus bars and covers at least the collar assembly and the plurality of bus bars; and
    a secondary device coupled to the power sub-feed device and including a switch coupled to a secondary power source and structured to selectively switch between the primary power source or the secondary power source based at least in part on a user selection of the primary power source or the secondary power source as a power supply source,
    wherein the power sub-feed device is further structured to receive primary power from the primary power source, deviate the primary power received from the main power panel to the secondary device via the power deviation terminal, receive power from the secondary device via the power reception terminal, and supply the power from the selected power supply source to the load via the load terminal.

14. The power sub-feed device system of claim 13, wherein the power sub-feed device is further structured to replace a main breaker disposed in the main power panel, and the secondary device is structured to receive the main breaker that has been replaced by the power sub-feed device.

15. The power sub-feed device system of claim 14, wherein the line terminal of the power sub-feed device is structured to be coupled to the primary power source and the power deviation terminal of the power sub-feed device is structured to be coupled to the main breaker disposed in the secondary device, and the switch is further structured to be coupled downstream from the main breaker at one end and the power reception terminal at another end.

16. The power sub-feed device system of claim 13, wherein the power sub-feed device is further structured to be coupled downstream from the main breaker disposed within the main power panel, and the switch is structured to be coupled downstream from the main breaker.

17. The power sub-feed device system of claim 16, wherein the line terminal of the power sub-feed device is coupled to the main breaker, the switch is coupled directly to the power deviation terminal at one end and the power reception terminal at another end.

18. The power sub-feed device system of claim 13, wherein the power sub-feed device comprises at least two separate parts structured to be disposed at separate locations within the main power panel, the two separate parts including at least a first part and a second part, the first part including the line terminal and the power deviation terminal and the second part including the power reception terminal and the load terminal.

19. The power sub-feed device system of claim 18, wherein the line terminal is structured to be coupled to the main breaker, the power deviation terminal is structured to be coupled to one end of the switch, the power reception terminal is structured to be coupled to another end of the switch, and the load terminal is structured to be coupled to the load.

20. A method of distributing power using a power sub-feed device disposed in a main power panel coupled to a primary power source and a plurality of loads, the method comprising:
- receiving, by the power sub-feed device, primary power from the primary power source via a line terminal of the power sub-feed device;
- deviating, by the power sub-feed device, the primary power from the main power panel to a secondary device via a power deviation terminal of the power sub-feed device, the secondary device coupled to the main power panel, the secondary device including at least a switch coupled to a secondary power source;
- selecting one of the primary power source or the secondary power source as a power supply source as a power supply source based on a user input;
- receiving power from the selected power source via a power reception terminal of the power sub-feed device, and
- supplying the power to the plurality of loads via a load terminal of the power sub-feed device.

\* \* \* \* \*